March 9, 1954
E. WETT
2,671,689
APPARATUS FOR COATING METALS BY
MEANS OF POWDERED MATERIAL
Filed Aug. 4, 1950
2 Sheets-Sheet 1
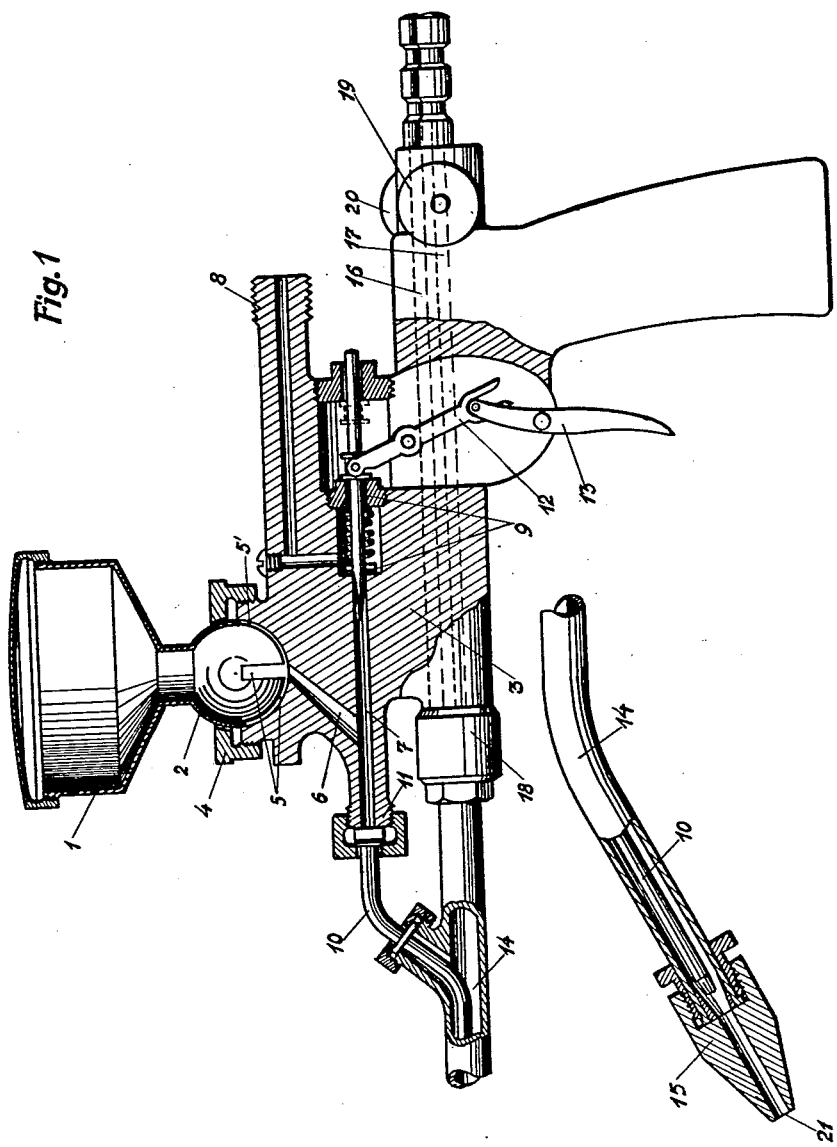
INVENTOR:
Ernst Wett
BY Armand E. Mattern
Attorney

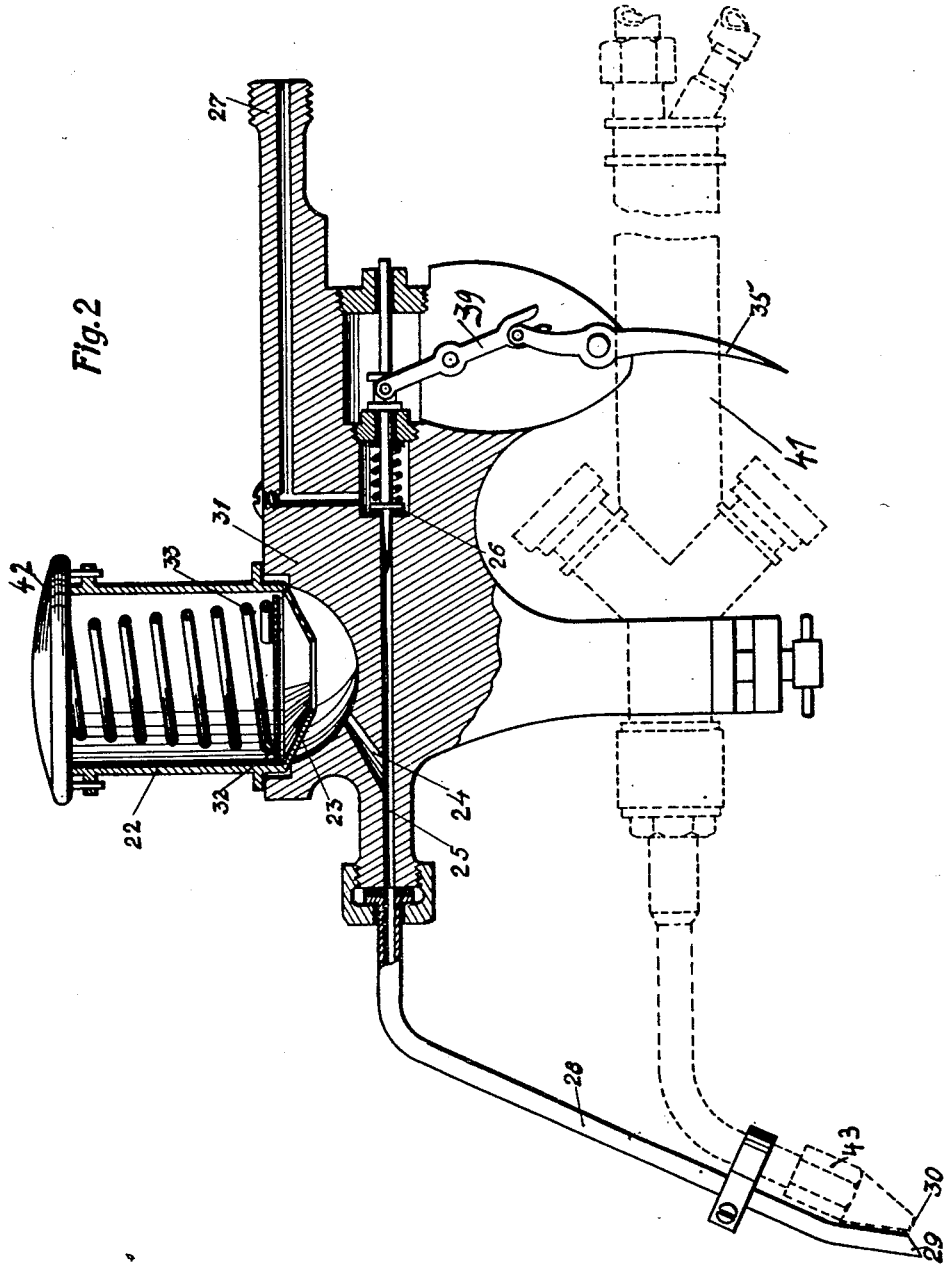

Patented Mar. 9, 1954

2,671,689

UNITED STATES PATENT OFFICE 2,671,689

APPARATUS FOR COATING METALS BY MEANS OF POWDERED MATERIAL

Ernst Wett, Dusseldorf, Germany

Application August 4, 1950, Serial No. 177,726

5 Claims. (Cl. 299—28.7)

1

This invention relates to oxy-acetylene welding and other torches, and has to deal more particularly with the method of and means for automatically feeding metal particles to the weld or to the surface or to the work.

Hitherto it was necessary for the welder to attend the weld as well as the rod and consequently, he could not work with the wanted thoroughness and speed. Furthermore there is a loss of heat in the work or the place to be treated, for some of the heat produced is consumed for melting the rod. When powdery material is used, the particles blown through the heating flame as a spray cone, reach the not-preheated work in an unmelted condition, with the result, that they adhere to the surface but that no thorough amalgamation of the particles with the metal takes place.

The general object of the present invention is to feed the powdery material for welding, soldering, cutting or coating in a concentrated manner to the work through the top of the core of the heating flame in order to convey the metal particles melted to the heated work without losing and scattering any of the metal particles which are being supplied in the operation. The short time of passing through the heating flame is sufficient to melt the little particles of the powdered welding, soldering or coating material so that in already fluid condition they are thrown into the weld or soldered joint. Thus the melted particles flow into the weld seam or soldered joint, whereby the weld or soldered joint is closed absolutely accurate and smooth.

When, according to the invention, Thermit is used, that needs only an exchange of the blow pipe of the welding apparatus, a welding and cutting temperature, essentially higher than hitherto is effected, and the welding and cutting process is considerably speeded, saving time and material.

A further object of the present invention is to provide a regulation of the quantity of the powdered material to be fed to the heating flame independent from the regulation of the gas or oxygen by changing either the feeding of the powdered material with a constant oxygen stream or by changing the oxygen stream with constant feeding of the powdered material. This may be effected by inserting a regulating mixture

2 valve into the corresponding conduit. By all means, the quantity of the powdered material being fed accommodates the requirements at any time and can relatively be reduced or increased.

A further object of the invention is to mix an additional powdered material, such as carbon, manganese, chrome, with the powdered material for improving and corresponding powdered material for alloying or increasing the temperature.

A still further object is to provide a device for insuring the feeding of the powdered material in any position of the apparatus. This may be effected by arranging the reservoir for the powdered material pivotally on the body of the apparatus by means of a ball joint, or by arranging a disk in the reservoir under the action of a compression spring.

The various features of the present invention will be readily understood from an inspection of the accompanying drawings illustrating the best form of the invention at present devised, in which Fig. 1 is a side view partly in section, Fig. 2 illustrates the apparatus as an additional apparatus for a known apparatus for welding, soldering and cutting in a side view, partly in section.

1 is the reservoir for the powdered material for welding, soldering or coating and, in case the apparatus is used as a fusing burner, the reservoir for the powdered material for increasing the temperature, such as Thermit. When using the welding apparatus for cutting, the burner head or blow pipe must be exchanged in the known manner. The bottom of the reservoir 1 has the shape of a funnel, the lower opening of which is connected with a hollow ball 2 pivotally mounted in a half ball cup of the body or support 3 and adjustable in each position by means of a screwed cap 4. The part of the hollow ball 2 placed in the half ball cup, is provided with two slots 5 and 5' rectangularly arranged one to another.

The lowest point of the half ball cup of the body 3 is connected with an inclined passage 6 enlarging downward into the compressed air channel 7 which with its one end is connected with the compressed air-connecting-branch 8 over the valve 9, and which with its opposite end is provided with a thread branch 11 to which a feed pipe 10 is screwed. The opening and closing of the compressed air valve is effected by triggers 12 and 13. The feed pipe 10 is arranged in such a manner, that its end terminates coaxially into a tube 14. This arrangement causes the powdered material to be guided through the core of the heating flame of the blow pipe or burner head 15. The gas passage 16 and the oxygen passage 17 pass through the body 3 of the apparatus to the combining nozzle 18, with which the conduit 14 for the combined oxygen and gas stream is connected. The conduit 14 bears the blow pipe or burner head 15. A valve 19 connects the gas passage 16 with the tube feeding the gas, and the valve 20 connects the oxygen passage 17 with the tube for feeding the oxygen.

The structure illustrated in Fig. 2 is used with a conventional welding torch 41 as shown in dotted lines. 22 is the reservoir for the powdered material. To insure a continuous feeding of the powdered material in any position of the apparatus with this reservoir fixed on the body 31, a disk 32 of the diameter of the reservoir airtightly closed by a cap 42 is provided therein being pressed under the action of a conical spring 33. This spring abuts against the disk 32 and the cap 42. 23 is the funnel-shaped bottom of the reservoir 22, 24 the connecting passage to the compressed air passage 25, 29 the outlet of the flexible feed pipe 28, 30 the opening of the blow pipe or burner head 43, 26 the compressed air valve operated by the triggers 35 and 39, 27 the compressed air branch, 31 the body of the apparatus. The feeding of the powdered material to the flame is effected by guiding the feed pipe 28 to the blow pipe or burner head 43 outside the conduit for the combined gas and oxygen stream and mounted thereon in such a manner, that the pipe outlet 29 is placed directly over the blow pipe opening 30, and the jet of the powdered material is directed to the top of the core of the heating flame. The powdered material thereby passes through the top of the core of the flame.

The apparatus operates as follows:

The reservoir is filled with the powdered material consisting of the same material used as hitherto, but powdered. After filling, the gas valve 19 and the oxygen valve 20 are opened, the gas and oxygen mix is ignited at the openings 30 and 21, respectively, of the blow pipes or burner heads 15 or 43 and the flame is regulated by means of the valves 19 and 20. Thereupon the work is heated by the flame up to the temperature required. When the metal is sufficiently heated the compressed air valve 9 or 26 is opened by pressing the trigger 13 or 35 over the levers 12 or 39, respectively, with one finger of the hand directing the apparatus and pressed air streams through the passages 7 or 25. A suction in the passages 6 or 24 results therefrom effecting that the powdered material is conveyed from the reservoirs 1 or 22, respectively, through the passages 6 or 24 into the passages 7 or 25 and, by means of the pressed air farther through the feed pipes 10 or 28. In the embodiment of Fig. 1 the powdered material is carried away with the combined gas and oxygen stream between combining nozzle 18 and blow pipe 14 through the blow pipe to the heating flame. In the embodiment of Fig. 2 the feed pipe 28 is attached to the blow pipe 43 so that the end of the pipe and consequently the jet points to the top of the core of the heating flame. In both cases the powdered material is forced to pass the top of the core on its way to the work.

When the apparatus, after changing the blow pipe, is used as a fusing burner with powdered Thermit the heating flame may be kept very small or even be cut down after introduction of the cutting process.

The new method and apparatus furthermore permits the coating of surfaces similar to the metal spraying process with any material, whereby these coatings are especially solid, for by simultaneous heating of the surface to be worked in connection with the fluid metal thrown against the surface, the coating is thoroughly amalgamated with the metal.

The new apparatus is also adapted to restore worn out planes especially parts of machines by supplying them with a thick coating.

Having thus described the invention what I claim as new and desire to secure by Letters Patent is:

1. A welding apparatus, comprising in combination: a body having the shape of a small gun, a longitudinal duct arranged in said body and having two end portions, one of said end portions being connectable to a supply of compressed air, a spring-loaded needle valve arranged in said duct so as to normally interrupt the connection between said two end portions, a hand-operated trigger mechanism acting on said needle valve and being adapted to open the same against the force of the spring loading said needle valve so as to establish a communication between said end portions of said duct and thus to admit compressed air to the other said end portions, a reservoir for powdered material arranged above said other end portion, means connecting said reservoir with said other end portion, said connecting means becoming operative when said trigger mechanism is opened for admitting compressed air to said other end portion of said duct, and a conduit for admitting a mixture of compressed combustion supporting gas and combustible gas, said conduit being arranged so as to admix said mixture to the powdered material leaving said other end portion.

2. A welding apparatus as claimed in claim 1, and means for securing said reservoir to said body so as to render the quantity of powdered material fed into said connecting means independent to the exact vertical position of said reservoir.

3. A welding apparatus as claimed in claim 1, and a ball joint arranged at the bottom of said reservoir and connecting the same to said connecting means.

4. A welding apparatus as claimed in claim 1, a displaceable disc arranged in the bottom part of said reservoir, and a compression spring using said displaceable disc into a position forcing the material out of said reservoir into said connecting means.

5. A welding apparatus comprising in combination: a body, a longitudinal duct arranged in said body and having two end portions, one of said end portions being connectable to a supply of compressed air, a valve arranged in said duct, said valve having two end positions closing and opening, respectively, said duct, means for urging said valve into said closing end position thereof so as to interrupt the connection between said two end portions, a hand-operated trigger mechanism acting on said valve and being adapted to open the same against said urging means so as to establish a communication between said end portions of said duct and thus to admit compressed air to the other of said end portions, a reservoir for powdered material arranged above said other end portion, means connecting said reservoir with said other end portion, said connecting means becoming operative when said trigger mechanism is opened for admitting compressed air to said other end portion of said duct, and a conduit for admitting a mixture of compressed combustion supporting gas and combustible gas, said conduit being arranged so as to admit said mixture to the powdered material leaving said other end portion.

ERNST WETT.

References Cited in the file of this patent

UNITED STATES PATENTS

| Number | Name | Date |
|---|---|---|
| 1,161,366 | Wohlrab | Nov. 23, 1915 |
| 1,585,990 | Houghton | May 25, 1926 |
| 1,617,166 | Schoop | Feb. 8, 1927 |
| 1,756,381 | Pahl | Apr. 29, 1930 |
| 1,781,603 | Schori | Nov. 11, 1930 |
| 2,072,845 | Benoit | Mar. 9, 1937 |
| 2,317,173 | Bleakley | Apr. 20, 1943 |
| 2,389,702 | Ullmer | Nov. 27, 1945 |

FOREIGN PATENTS

| Number | Country | Date |
|---|---|---|
| 298,858 | Great Britain | Oct. 28, 1928 |